2,989,455
PROCESS FOR CONVERTING ACRYLIC COMPOUNDS TO A HIGHER POLYMERIZATION DEGREE BY PHOTO-POLYMERIZATION
Wilhelm Neugebauer, Wiesbaden-Biebrich, and Martin Glos, Wiesbaden, Germany, and Klaus Kasper, Parkersburg, W. Va., assignors, by mesne assignments, to Azoplate Corporation, Murray Hill, N.J., a corporation of New Jersey
No Drawing. Filed June 5, 1957, Ser. No. 663,582
Claims priority, application Germany June 6, 1956
17 Claims. (Cl. 204—158)

The present invention relates to a process for converting acrylic compounds to a higher polymerization degree by photo-polymerization.

It is known that the polymerization degree of polymerizable organic compounds is altered under the action of light in that the compounds are converted to a higher degree of polymerization. Under direct radiation the conversion of polymerizable compounds to a higher degree of polymerization proceeds very slowly; in view of the fact that polymerizable compounds absorb only short wave light when being converted to a higher polymerization degree, photo-polymerization by direct radiation did not gain a practical interest. Attempts have, therefore, been made to find substances which may be added to the polymerizable compounds and which are capable of accelerating the polymerization.

As sensitizers there have partialy been used compounds of the type of the benzoins and partially systems which have become known under the designation of Redox systems. Systems recently developed which are suitable for use as sensitizers in the photo-polymerization of monomeric polymerizable compounds consist of dyestuffs and reducing agents. The sensitizers absorb light rays from a part of the spectrum of a longer wave length than do the polymerizable compounds themselves; the addition of sensitizers makes photo-polymerization practically interesting for use in continuous polymerization processes and in other fields of application, in which it is important to dispose of highly polymeric substances that may rapidly and simply be prepared from well workable monomers or low polymers. Such polymerization processes are of considerable importance, for example, in the production of compound glass.

The object of this invention is a process for converting propenyl compounds to a higher polymerization degree under the action of light, wherein light rays are allowed to act in the presence of anthraquinone substances upon the propenyl compounds to be polymerized. The "propenyl" terminology, as used herein, is meant to include acrylyl and α-lower alkyl acrylyl compounds, particularly acrylyl and methacrylyl compounds.

The term "anthraquinone substances" as used herein comprises especially anthraquinone itself, its sulfo-acids and carboxylic acids and the inorganic and organic salts and functional derivatives of these acids, for example the halides, amides or esters and furthermore anthraquinone aldehydes. There may be mentioned, for example, anthraquinone-2-sulfonic acid, anthraquinone-2-carboxylic acid, anthraquinone-2-carboxylic acid chloride, anthraquinone-1-carboxylic acid amide, antraquinone-2-carboxylic acid ethyl ester, anthraquinone-2-sulfonic acid amide, anthraquinone-2-sulfonic acid chloride, anthraquinone-2,7-disulfonic acid, anthraquinone-2,6-disulfonic acid and anthraquinone-2-aldehyde. As sensitizers according to this invention there may also be used anthraquinone and the aforesaid derivatives thereof which are substituted in the nucleus by halogen or methyl groups or nitro groups or alkoxy groups, for example 1- or 2-chloranthraquinone, 1,4-dimethylanthraquinone, 2-methoxyanthraquinone, 1-methyl-4-chloranthraquinone, 1-nitroanthraquinone-4-sulfonic acid, 1,4-dichloranthraquinone-2-sulfonic acid, 1-nitroanthraquinone-8-sulfonic acid. The above sensitizers may be used individually or in admixture with one another. Salts (e.g. alkali and alkaline earth metal salts) of the acids may also be used.

The propenyl compounds to be polymerized are especially propenoic acids, such as acrylic acid and methacrylic acid; and the salts and functional derivatives of these acids. Apart from acrylic acid and methacrylic acid, there may be used, for example, acrylamide or substituted acrylamide, such as acrylic acid dicyclohexylamide, N-acroylethylurethane, N-tertiary butylacrylamide, acrylic acid dibutylamide, acrylic acid anilide, acrylic acid para-diethylamino-anilide; acrylic acid esters, such as acrylic acid lower alkyl esters, e.g. the methyl ester or ethyl ester of the corresponding methacrylic acid derivatives. Under the action of light there may also be polymerized polyfunctional monomers, i.e. monomers containing at least two double bonds in the molecule. There may be mentioned by way of example, N,N'-methylene-bis-acrylamide, N,N'-bis-methacroylethylene-1,2-diamine or N,N'-bis-methacroylhexamethylene-1,6-diamine.

The propenoic acid compounds may be polymerized individually or in admixture with one another. They may also be polymerized in admixture with other polyfunctional compounds, for example with triallylcyanurate or N,N-diallyl-melamine, which latter compounds alone cannot be polymerized by the addition of anthraquinone substances. The addition of such polyfunctional monomers to polyacrylic compounds results in a chain branching or cross-linking effect and changes substantially the properties of the corresponding highly polymeric substances, for example, the solubility.

The light sources used in the process of this invention are advantageously lamps radiating light having a wave length such that it is absorbed by the sensitizer, for example, carbon arc lamps, mercury lamps or also sunlight.

The photo-polymerization according to this invention may be carried out in known manner, for example, as a solvent polymerization, emulsion polymerization or bulk polymerization. Depending on whether the resulting polymer is insoluble, swellable or soluble in the monomer or the solvent added, the high molecular substances are obtained in the form of flocculent precipitates, swollen gels or clear and transparent masses.

The polymerizable mixtures containing the sensitizer are stable in the dark. To start the reaction it is necessary to radiate with light having a wave length such that it is absorbed by the anthraquinone substance used as a sensitizer. The concentration of the sensitizer may vary within very wide limits up to the maximum solubility. It is, however, preferred to adapt the concentration of the sensitizer to the thickness of the absorbing layer and to select this concentration so that 50–60% of the light are absorbed in the absorption maximum.

In the process of this invention polymerization commences very rapidly after exposure to light. In some cases polymerization sets in already after some seconds, and sometimes it takes 1 to 2 minutes. As soon as the polymerization sets in, it is finished nearly completely within a few minutes. In adition thereto, polymerization takes place at low temperatures, for example, at room temperature, but it may also be carried out at a raised temperature.

It has further been found that the sensitiveness of the reaction mixture consisting of a polymerizable propenoic compound and an anthraquinone substance can be considerably increased and the polymerization considerably accelerated by adding to the reaction mixture an oxidizing agent or a reducing agent. This addition has another favorable effect in that the period of time between exposure to light and the start of polymerization is reduced. Exemplary for the reducing agents used in this invention are: Derivatives of sulfurous acid, for example the normal and acid salts thereof; furthermore, sulfinic acids, for instance benzene-sulfinic acid, methane-sulfinic acid, ethane-sulfinic acid, etc., and the salts thereof, such as the alkkali metal salts, e.g. sodium, potassium, etc.; the corresponding salts of thiosulfuric acid; of sulfoxylic acid or other compounds of this acid, for example formaldehyde sulfoxylate; carboxylic acids and hydroxycarboxylic acids, for example formic acid, oxalic acid, tartaric acid, citric acid, succinic acid and the salts of these acids (e.g. sodium, potassium, etc., formate, oxalate, tartarate, citrate, succinate); there may also be used thiourea and hydrazine compounds, for example phenylhydrazine. As oxodizing agents there are preferably used organic peroxides, for example, benzoylperoxide, tert.-butylhydroperoxide and acetylperoxide; the salts of persulfuric acid, perborates, perchlorates and salts of nitric acid (e.g. the sodium, potassium or other alkali salts of these acids). Also hydrogen peroxide may be used.

The choice of the most effective oxidizing and reducing agent depends on the monomer and the polymerization conditions, for example on the solvent used. The concentration in which these polymerization accelerators are used is not critical; in most cases, however, the maximum effect is already reached with an addition of 0.5–1%.

The advantage offered by the process of this invention resides in its universal applicability which is determined by the new sensitizers used. With the use of an anthraquinone substance photo-polymerization may be carried out in water and in organic solvents, because both the water-soluble compounds of the anthraquinone series, for example the anthraquinone sulfonic acids and those which are soluble in organic solvents are active sensitizers. The anthraquinone substances to be used according to this invention are insensitive to a change of the pH value, so that the process may be carried out in a pH range within 1 and 10. It is, however, preferred to operate at a pH range of between 5 and 7.

The following examples serve to illustrate the invention but they are not intended to limit it thereto:

Example 1

A 12% calcium acrylate solution in water, containing 0.1% of the sodium salt of anthraquinone-2,7-disulfonic acid, is exposed to light under an arc lamp (18 a./120 v.) in a distance of about 80 cm. Polymerization sets in after 10–15 seconds and the solution solidifies after 2–3 minutes to give a stiff magma of calcium polyacrylate. Polymerization is accelerated by the addition of a reducing agent or an oxidizing agent as results from the following table indicating the polymerization results obtained after exposure to light for 3 minutes with the use of the above calcium acrylate solution containing 0.25% of the sodium salt of anthraquinone-2,7-disulfonic acid as sensitizer and 1% of an oxidizing agent or 1% of a reducing agent:

| Accelerator: | Percent polymer |
| --- | --- |
| $K_2S_2O_8$ | 60 |
| $NaNO_3$ | 64 |
| $Na_2SO_3$ | 39 |
| Without accelerator | 28.5 |

The aqueous calcium acrylate solutions are stable in the dark even after the addition of the sensitizer and an accelerator. No change of the monomer can be detected after a 14 days' storage.

Instead of calcium acrylate there may be used zinc acrylate or aluminum acrylate and instead of the sodium salt of anthraquinone-2,7-disulfonic acid there may be used another organic or inorganic salt of this acid, for example paratoluidine salt, or another mono- or disulfonic acid of anthraquinone or an inorganic or organic salt thereof, for example 1- or 2-anthraquinone sulfonic acid or 1,8-, 1,5-, 2,6- or 2,7-anthraquinone disulfonic acid. There may also be used as sensitizer the corresponding anthraquinone carboxylic acids or the salts thereof.

Example 2

A 20% solution of acrylamide in water, containing 1% of N,N'-methylene-bis-acrylamide, is exposed to the action of light under an arc lamp (18 a./120 v.) in the presence of 0.25% of the potassium salt of anthraquinone-2,6-disulfonic acid and 0.5% of the sodium salt of benzene sulfinic acid. The solution solidifies after 2 minutes to give a solid, clear and gel-like mass which is insoluble in boiling water.

Example 3

7 parts by weight of an 80% aqueous zinc chloride solution containing 0.1–0.5% of the sodium salt of anthraquinone-2,7-disulfonic acid (or another anthraquinone sulfonic acid or the salt thereof, or other anthraquinone substances, for example anthraquinone carboxylic acids and the salts thereof, soluble in these salt solutions, such as zinc chloride solutions), are mixed with 3 parts by weight of acrylonitrile. The mixture is then exposed to the action of light using an arc lamp (18 a./120 v.). Polymerization commences immediately and is accompanied by a constantly increasing thickening of the solution. The solution has a honey-like consistency already after 60–90 seconds. By pouring this syrup in a thin jet into water or by forcing it into water using a nozzle there are obtained filaments of polyacrylonitrile. A prolonged exposure to light leads to a rubber-like coherent mass which can no longer be processed to yield filaments. The solution of acrylonitrile is stable in the dark. By the addition of a reducing agent, for example, the sodium salt of benzene sulfinic acid, the polymerization is already started in the dark; a proper redox polymerization takes place. The advantage of a photo-chemical process resides in the fact that the reaction may be interrupted at any stage by arresting the exposure to light.

Instead of a zinc chloride solution there may also be used concentrated solutions of other inorganic salts or mixtures thereof, which enable spinnable polymers to be obtained by a solvent polymerization; there may be used, for example, solutions of sodium perchlorate, calcium perchlorate, aluminum perchlorate or mixtures of zinc chloride and alkali metal chloride, or zinc chloride and and alkaline earth metal chloride.

Example 4

A 10% solution of acrylamide in ether or alcohol or acetone or in a mixture of these solvents, which contains 0.2% of anthraquinone, commences to polymerize under an arc lamp after about 1 minute. Depending on the swelling capacity of polyacrylamide in the solvent used, the polymer is obtained after an exposure to light for 4–5 minutes varying in its form from a flocculent precipitate to a swollen gel.

Example 5

A mixture of 20 parts by weight of methacrylic acid and 80 parts by weight of dioxane, containing 0.2% of anthraquinone, commences to polymerize under the light of an arc lamp after 45 seconds. The solution solidifies after 4–5 minutes to form a magma.

Example 6

A 5% solution of acrylic acid dicyclohexylamide or N-acrylylethylurethane in ligroine, containing 0.25% of anthraquinone as sensitizer polymerizes slowly in a well proceeding reaction under the light of an arc lamp. Instead of anthraquinone there may also be used a derivative thereof which is soluble in ligroine, for example anthraquinone-2-aldehyde or 2-chloranthraquinone.

*Example 7*

Acrylic acid-N-dibutylamide containing not more than 0.25% of dissolved anthraquinone is exposed to the light of an arc lamp. Polymerization commences after 3–4 minutes and is accompanied by an increasing viscosity of the solution. Depending on the time of exposure there are obtained syrup-like or rubber-like or even glassy solid polymers. The addition of benzene sulfinic acid to the reaction mixture in the form of the sodium salt accelerates the polymerization but yields a less homogeneous and less clear polymer. By placing the solution to be polymerized as a thin layer between two glass plates, the latter are firmly bonded together after exposure to light. Instead of acrylic acid dibutylamide there may also be used a mixture of acrylonitrile and acrylic acid dibutylamide.

*Example 8*

Acrylonitrile containing 0.2% of dissolved anthraquinone commences to polymerize after 3–4 minutes under the light of an arc lamp. After 30 minutes a thick precipitate of polyacrylonitrile has formed.

*Example 9*

2.5 parts by weight of acrylonitrile are emulsified with 7.5 parts by weight of an aqueous solution of 0.5% of the sodium salt of anthraquinone-2,7-disulfonic acid containing 1% of tragacanth. The emulsion is exposed to the light of an arc lamp. Polymerization sets in after 1–2 minutes and is accompanied by gelatinization of the reaction mixture. The sodium salt of anthraquinone-2,7-disulfonic acid may be replaced by other anthraquinone sulfonic acids or salts thereof, for example by anthraquinone-2,6- or 1,5- or 1,8-disulfonic acid, anthraquinone-1- or 2-sulfonic acid or the salts thereof. The tragacanth used as an emulsifier may also be replaced by another emulsifier.

*Example 10*

3 parts by weight of acrylic acid dibutylamide are emulsified with 7 parts by weight of an aqueous solution of 0.5% of the potassium salt of anthraquinone-2,6-disulfonic acid and 2% of a condensation product of a high molecular fatty acid and a hydroxy- or aminoaliphatic carboxylic acid or sulfonic acid (in the form of its sodium salt), for example a condensation product of the type of oleic acid methyl tauride. The emulsion is exposed to the light of an arc lamp. Polymerization commences after 1 minute. Polymerization may be accelerated by the addition of the sodium salt of benzene sulfinic acid.

*Example 11*

Acrylic acid methyl ester is processed to give a 25% emulsion with the use of an aqueous solution containing 1% of tragacanth, 0.25% of the sodium salt of anthraquinone-2,7-disulfonic acid and 0.5% of the sodium salt of benzene sulfinic acid. The emulsion is exposed to the light of an arc lamp. Flocculent polymerization commences after exposure to light for 1 minute.

*Example 12*

A 5% solution of acrylic acid ethyl urethane in water, containing 0.2% of the sodium salt of anthraquinone-2-sulfonic acid is exposed to the light of an arc lamp in the presence of 1% each of the carboxylic acid salts or free carboxylic acids indicated below. The following times were found from the onset of exposure to light until the onset of polymerization:

|  | Seconds |
|---|---|
| Sodium formate | 5–10 |
| Sodium oxalate | 5–10 |
| Ammonium oxalate | 5–10 |
| Oxalic acid | 60 |
| Sodium succinate | 25 |
| Sodium citrate (tertiary) | 25 |
| Sodium tartrate | 20 |
| Without addition | 90 |

*Example 13*

A 10% solution of acrylic acid amide in dioxane, which contains also 0.2% of anthraquinone-2-sulfochloride, is exposed to the light of an arc lamp. After 10 seconds vivid polymerization starts, and after 5 minutes the polyacrylic acid amide has precipitated in the form of a gel.

*Example 14*

If a solution of 10 cc. of acrylonitrile in 90 cc. of methanol, to which 0.2 g. of anthraqunone-2-sulfonic acid amide have been added, is exposed under an arc lamp, noticeable polymerization starts after 40 seconds. 10 minutes later the polyacrylonitrile precipitates in the form of flakes.

If the anthraquinone-2-sulfonic acid amide heretofore mentioned is replaced by the anthraquinone-2-sulfonic acid methyl ester, progress and result of the polymerization process are equally good.

Obviously many modifications and variations of the present invention are possible in the light of the above teachings. It is, therefore, to be understood that within the scope of the appended claims the invention may be practiced otherwise than as specifically described.

What is claimed is:

1. A process for the polymerization of polymerizable propenyl monomers wherein the propenyl monomers are exposed to the polymerizing action of light in the presence of a catalytic amount of an anthraquinone.

2. A process for the polymerization of polymerizable propenyl monomers wherein the propenyl monomers are exposed to the polymerizing action of light in the presence of a catalytic amount of an anthraquinone and of a member of the group consisting of oxidizing and reducing agents.

3. A process of claim 1 wherein the propenyl monomers are selected from the group consisting of acrylic acid, methacrylic acid, salts of said acids and functional derivatives of the carboxyl radical of said acids.

4. A process of claim 3 wherein the anthraquinone is an anthraquinone acid.

5. A process of claim 3 wherein the anthraquinone is an anthraquinone acid halide.

6. A process of claim 3 wherein the anthraquinone is an anthraquinone acid amide.

7. A process of claim 3 wherein the anthraquinone is an anthraquinone acid ester.

8. A process of claim 3 wherein the anthraquinone is an anthraquinone aldehyde.

9. The process of claim 2 in which the group member is a sulfite.

10. The process of claim 2 in which the group member is an oxalate.

11. The process of claim 2 in which the group member is an organic peroxide.

12. The process of claim 1 in which the polymerization is carried out in an aqueous medium.

13. A process for the polymerization of polymerizable acrylyl monomers wherein the acrylyl monomers are exposed to the polymerizing action of light in the presence of a catalytic amount of anthraquinone.

14. A process for the polymerization of polymerizable acrylic acid amides wherein the acrylic acid amides are exposed to the polymerizing action of light in the presence of a catalytic amount of an anthraquinone.

15. A process for the polymerization of polymerizable acrylonitriles wherein the acrylonitriles are exposed to the polymerizing action of light in the presence of a catalytic amount of an anthraquinone.

16. A process for the polymerization of polymerizable acrylic acid esters wherein the acrylic acid esters are exposed to the polymerizing action of light in the presence of a catalytic amount of an anthraquinone.

17. A process for the polymerization of polymerizable acrylic acid salts wherein the acrylic acid salts are exposed to the polymerizing action of light in the presence of a catalytic amount of an anthraquinone.

References Cited in the file of this patent

UNITED STATES PATENTS

| 1,945,067 | Nozicka | Jan. 30, 1934 |
| 2,344,785 | Owens et al. | Mar. 21, 1944 |

FOREIGN PATENTS

| 717,708 | Great Britain | Nov. 3, 1954 |

OTHER REFERENCES

Chemical Abstracts, v. 36 (1942), columns 21 and 22.